United States Patent [19]

Tschang et al.

[11] Patent Number: 4,885,597
[45] Date of Patent: Dec. 5, 1989

[54] NON-IMPACT PRINTER APPARATUS WITH IMPROVED CURRENT MIRROR DRIVER AND METHOD OF PRINTING

[75] Inventors: Pin S. Tschang, Rochester; Hieu T. Pham, Webster; Kenneth D. Kieffer, Rochester, all of N.Y.

[73] Assignee: Eastman Kodak Company, Rochester, N.Y.

[21] Appl. No.: 290,012

[22] Filed: Dec. 27, 1988

[51] Int. Cl.$^4$ ............................................. G01D 15/00
[52] U.S. Cl. ...................................... 364/519; 346/154
[58] Field of Search ................. 364/518, 519; 346/154, 346/160, 107 R, 108; 358/300

[56] References Cited

U.S. PATENT DOCUMENTS 4,746,841  5/1988  Pham et al. .......................... 346/154
4,831,392  5/1989  Dei ....................................... 346/154

Primary Examiner—Arthur G. Evans
Attorney, Agent, or Firm—Norman Rushefsky

[57] ABSTRACT

An improved printer apparatus includes a print head having a series of point-like radiation sources, such as LED's, arranged in a row for exposing a recording medium. Logic means is provided for determining which of the point-like radiation sources are to be selected for energization. A current driver means responsive to the logic means provides electrical current to the radiation sources selected. A current driver means include a current mirror having a master circuit for generating a reference current and a plurality of slave circuits for providing respective driver currents to the radiation sources selected for energization. The master circuit includes a series of parallel connected transistors that may be instantaneously reprogrammed by digital control signals to said transistors. The characteristics of the transistors vary so that currents from them are scaled by say powers of two to provide an expanded current control capability. Environmental conditions and/or aging often require change in current to maintain desired recording performance. The need for such change may be automatically sensed and a new digital control word sent to the transistors to adjust current to the radiation sources.

24 Claims, 8 Drawing Sheets

| FIG. 9A |
| FIG. 9B |

NON-IMPACT PRINTER APPARATUS WITH IMPROVED CURRENT MIRROR DRIVER AND METHOD OF PRINTING

BACKGROUND OF THE INVENTION

1. Field of the Invention

The present invention relates to non-impact printing apparatus for recording on a moving photoreceptor or the like and a print-head for use therewith.

2. Brief Description of the Prior Art

In the prior art as exemplified by U.S. application Ser. No. 199,981, filed May 27, 1988, printer apparatus is described which comprises a multiplicity of individually addressable and energizable point-like radiation sources, such as LED's, arranged in rows for exposing points upon a photoreceptor during movement thereof relative to and in a direction normal to the rows. Driver circuits are provided for simultaneously energizing the radiation sources responsive to respective data bit input signals applied to the driver circuits during an information line period. The print or recording head includes a support upon which are mounted chips placed end to end and upon each of which are located a group of LED's. The driver circuits are incorporated in chips and located to each side of the linear array of LED chips. The driver circuits in this apparatus include a shift register for serially reading-in data-bit signals and for driving respective LED's in accordance with the data signals.

Associated with each driver chip is a current-level controller that controls the level of current into the LED's of that group during recording. The controller comprises a current mirror having a master control circuit whose current is mirrored in slave circuits to which the LED's are connected. One advantage of this prior art printer apparatus is that current to the LED's may be changed automatically as needed, due to changes in aging or temperature of the printhead. As such changes affect the light output of the LED's, the changes to the current compensate for same so that some uniformity is provided to the recording apparatus.

In the current mirror described in this prior art, the master control circuit (of which there are 50 or more on a printhead) includes a transistor and an adjustable resistor. The resistor of each driver circuit is adjusted precisely and then permanently fixed during manufacture to provide the desired current to the respective LED's that are controlled thereby. This is a time consuming operation with attendant expense. After manufacture and during operation of the printer, automatic changing of current in a master control circuit is provided by adjusting voltage to the transistor as the resistor is now fixed. In order to change these voltages, additional circuitry is required to provide controlled analog levels of current.

It is an object of the invention to improve upon the printer apparatus of the prior art with more efficient and simplified controls, particularly for permitting adjustments to current delivered to the recording elements.

SUMMARY OF THE INVENTION

The improved printer apparatus and method of the invention includes a print head having a series of point-like radiation sources arranged in a row for exposing a recording medium. Logic means is provided for determining which of the point-like radiation sources are to be selected for energization. A current driver means responsive to the logic means provides electrical current to the radiation sources selected for energization. The current driver means include a circuit having a master circuit for generating a reference current and a plurality of slave circuits for providing respective driver currents to the radiation sources selected for energization. The master circuit being further characterized by including a plurality of current control elements having an "on" state for causing current to be passed or created in said master circuit and having an "off" state preventing current from passing or being created and means providing a digital signal to said elements to selectively control which of the devices are in their respective "on"-"off" states.

DESCRIPTION OF THE PREFERRED APPARATUS

The apparatus and method of the preferred embodiments will be described in accordance with an electrophotographic recording medium employing LED's as an exposure source. The invention, however, is not limited to apparatus for creating images on such a medium or with such exposure devices as other media such as photographic film, etc. may also be used with the invention as well as other devices for providing image creation in accordance with the teachings of the invention.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art.

Figure 1:
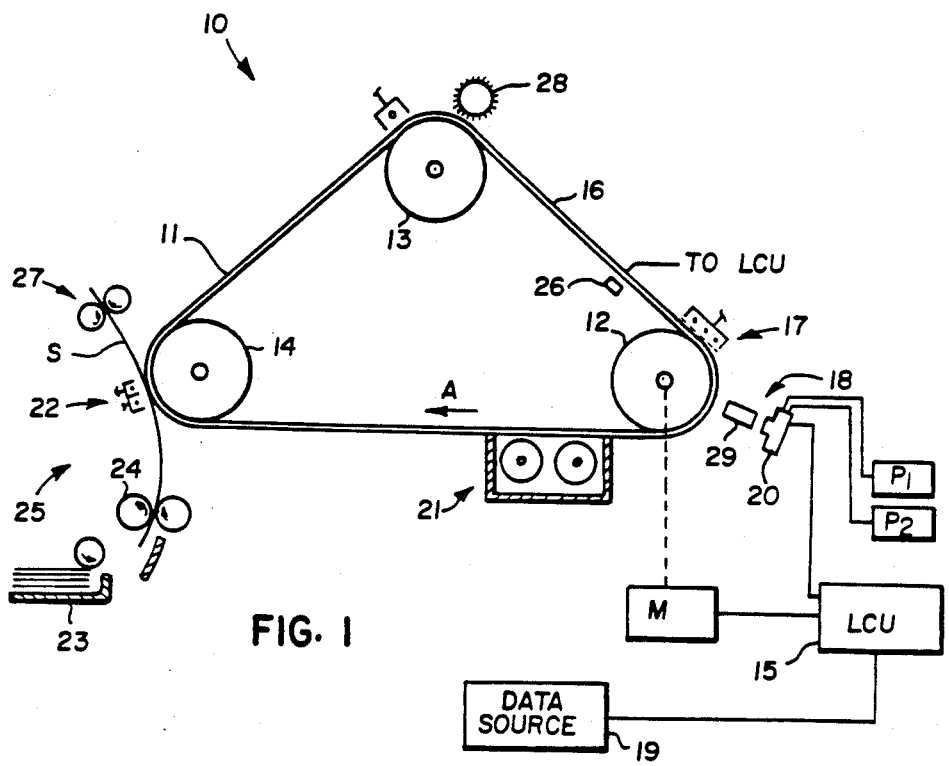
FIG. 1 is a schematic of a print apparatus made in accordance with the invention.

With reference now to FIG. 1, an electrophotographic reproduction apparatus 10 includes a recording medium such as a photoconductive web 11 or other radiation-sensitive medium that is trained about three transport rollers 12, 13 and 14, thereby forming an endless or continuous web. Roller 12 is coupled to a drive motor M in a conventional manner. Motor M is connected to a source of potential when a switch (not shown) is closed by a logic and control unit (LCU) 15. When the switch is closed, the roller 12 is driven by the motor M and moves the web 11 in clockwise direction as indicated by arrow A. This movement causes successive image area of the web 11 to sequentially pass a series of electrophotographic work stations of the reproduction apparatus.

For the purposes of the instant exposure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by a data source 19. The point-like radiation sources are supported in a print head 20 to be described in more detail below.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable means 26 for sensing web perforations. This sensing produces input signals into the LCU 15 which has a digital computer, preferably a microprocessor. The microprocessor has a stored program responsive to the input signals for sequentially actuating, then de-actuating the work stations as well as for controlling the operation of many other machine functions. Additional encoding means may be provided as known in the art for providing more precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
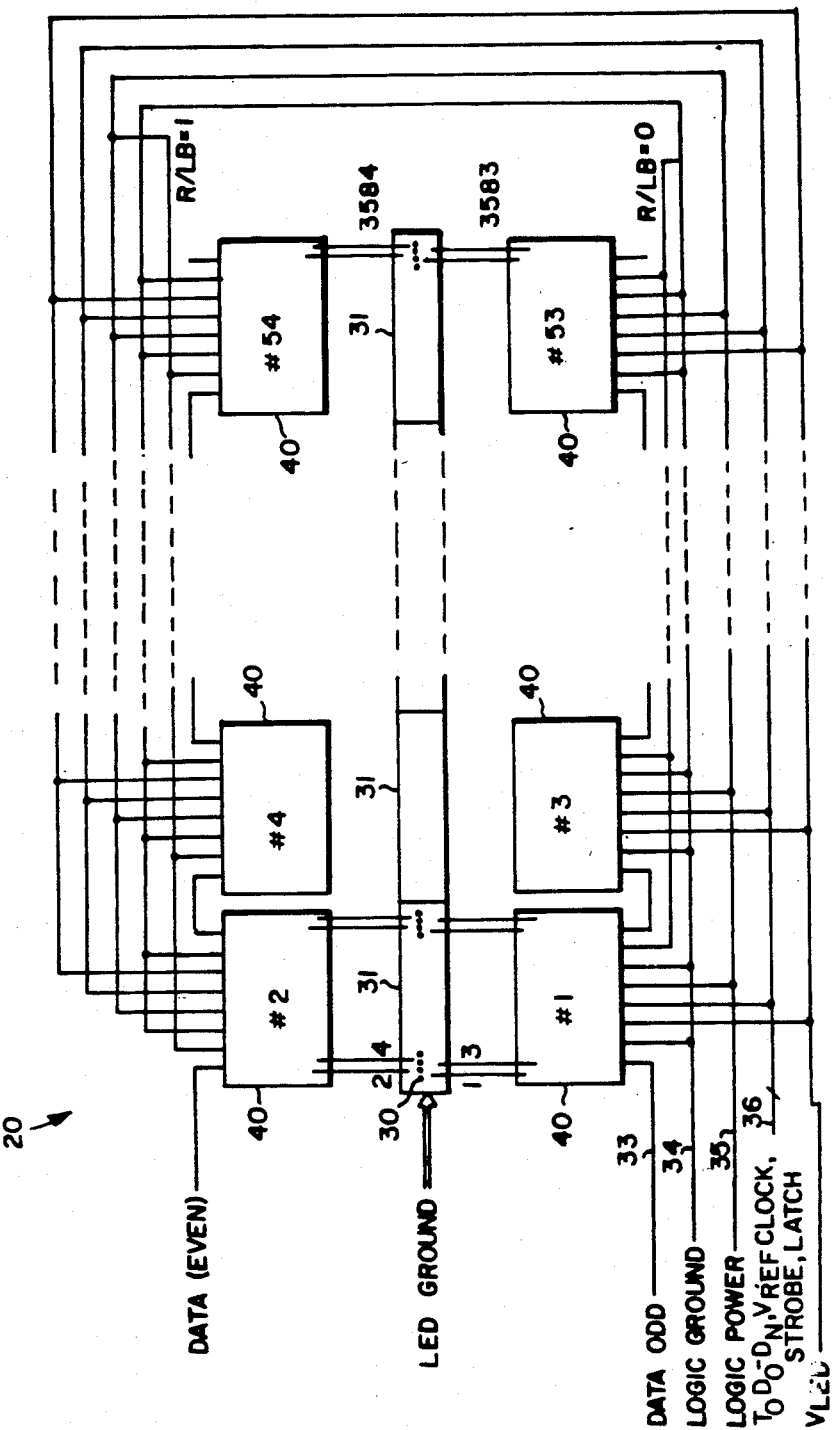
FIG. 2 is a block diagram of circuitry used in forming the print head shown in FIG. 1 in accordance with the invention.

With reference to FIGS. 1 and 2, the print head 20, as noted, is provided with a multiplicity of energizable point-like radiation sources 30, preferably light-emitting diodes (LED's). Optical means 29 may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Each of the chips 31 includes in this example 128 LED's arranged in a single row. Chips 31 are also arranged end-to-end in a row and where twenty-eight LED chips are so arranged, the print head will extend across the width of the web 11 and include 3584 LED's arranged in a single row. To each side of this row of LED's there are provided twenty-eight identical driver chips 40. Each of these driver chips include circuitry for addressing the logic associated with each of 64 LED's to control whether or not the LED should be energized as well as to determine the level of current to each of the LED's controlled by that driver chip 40. Two driver chips 40 are thus associated with each chip of 128 LED's. Each of the two driver chips will be coupled for driving of alternate LED's. Thus, one driver chip will drive the odd numbered LED's of the 128 LED's and the other will drive the even numbered LED's of these 128 LED's. The driver chips 40 are electrically connected in parallel to a plurality of lines 34–37 providing various electrical control signals. These lines provide electrical energy for operating the various logic devices and current drivers in accordance with their voltage requirements. A series of lines 36 (indicated by a single line in this FIG.) provide clock signals and other pulses for controlling the movement of data to the LED's in accordance with known techniques. A data line 33 is also provided for providing data signals in the form of either a high or low logic level. The driver chips each include a data in and data out port so that they serially pass data between them.

Figure 3:
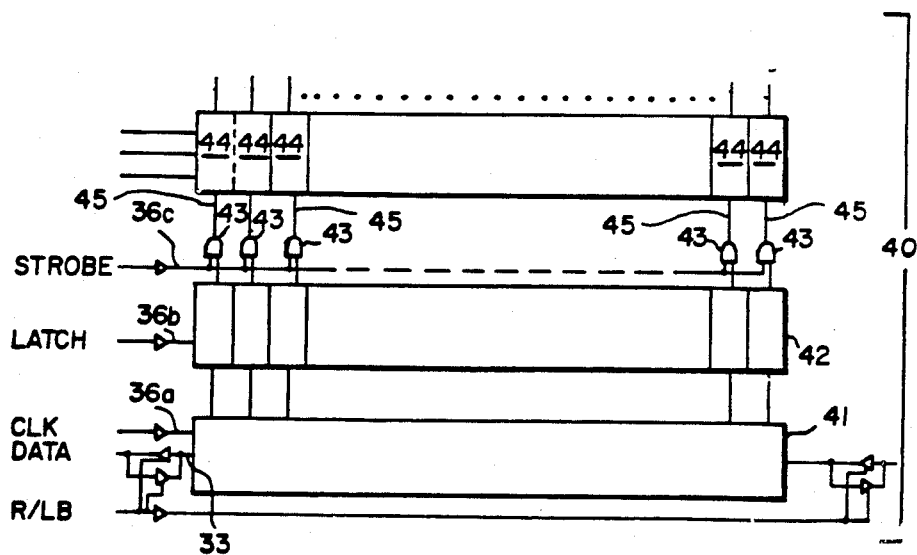
FIG. 3 is a block diagram of a driver circuit for use in the print head of FIG. 2.

With reference now to FIG. 3, the architecture for each driver chip 40 includes a 64 bit bidirectional shift register 41. A logic signal carried over line R/LB determines the direction data will flow down this register. Assume that this chip is enabled to cause data to flow down the register from left to right as shown in FIG. 3. Data thus enters shift register 41 over line 33 through the driver chip's data-in port at the left from say the data-out port of a driver chip immediately to the left or from the LCU if the driver chip 40 is the first chip for data to enter. Data exits from this chip at the data-out port to be input to the next adjacent driver chip to the right of driver chip 40. For each line of image to be exposed in the main scanning direction, i.e., transverse to that of movement of the recording medium or web 11, data from the data source suitably rasterized, in accordance with known techniques, streams serially through the shift registers under control of clock pulses provided by the LCU over line 36a. As may be noted, odd and even data may be moved simultaneously since they are provided on separate lines. Still further reductions in clock speed for moving data through the shift registers may be provided by providing additional lines for distributing data simultaneously. Thus, one line of data may be dedicated to even-numbered LED's of low number, i.e., those driven by driver chips numbered 2 through 28, a second line dedicated to even-numbered LED's of high number, i.e., those driven by driver chips numbered 30-56, and an additional two lines for similarly simultaneously driving odd-numbered LED's of low and high numbers, respectively. When 3584 bits of data (1's or 0's) are stored by the shift registers of all of the driver chips, a latch signal is provided over line 36b to latch this data into latch registers 42 so that the shift registers 41 may commence filling with data signals for the next line of exposure. Sixty-four latch registers 42 are provided in each driver chip to receive the data shifted out in parallel fashion from the shift register 41. Each latch register is associated with a particular LED and adjacent latch registers are associated with every other LED. A logic AND gate 43 is associated with each latch register and has one input coupled to the output of its respective latch register and its other input coupled to a line 36c for providing a strobe or timing pulse from the LCU. This strobe pulse determines when to trigger the LED's to turn on in relation to the position of the recording medium and the duration for which the LED's are turned on. All the AND gates have one of their inputs connected to this strobe line. Alternatively, a plurality of strobe lines may be provided with enabling times of different durations; see in this regard U.S. Pat. No. 4,750,010 to Ayers et al, the contents of which are incorporated herein by this reference. The output of each of the AND gates 43 is coupled to a logic circuit that is part of a constant current driver circuit 44.

Figure 4:
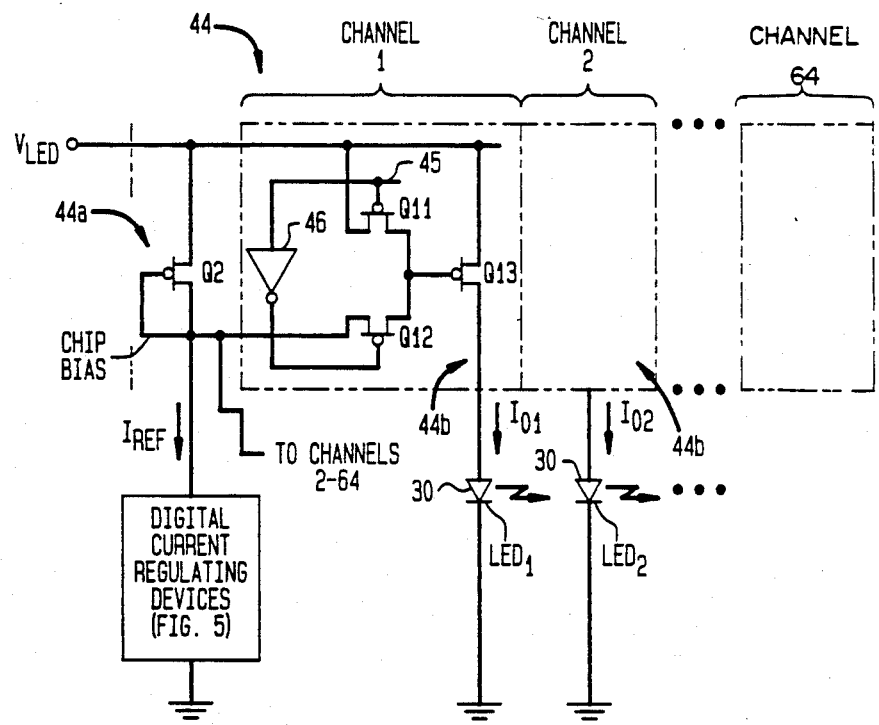
FIG. 4 is a schematic of a current driving circuit for the driver circuit of FIG. 3.

With reference now to FIG. 4, the output of each AND gate is fed over line 45 to a logic circuit that includes a logic inverter 46 and three p-channel enhancement mode MOSFET's (metal-oxide semiconductor field-effect transistors) Q11, Q12, and Q13. Transistor Q11 has its gate terminal connected to the input of the inverter and its source terminal connected to the line labeled $V_{LED}$ carrying a voltage of, say, 4.5 volts. The drain terminals of transistors Q11 and Q12 are both connected to the gate terminal of transistor Q13. The output of the inverter 46 is connected to the gate terminal of transistor Q12. The source terminal of transistor Q12 is connected to the gate of a similar type transistor Q2. Transistor Q2 is coupled to the line $V_{LED}$ at its source terminal. The drain terminal of transistor Q2 is coupled to the drain terminals of a series of n-channel enhancement mode transistors $Q1^0$–$Q1^N$. The gate terminal of Q2 is also connected to its own drain terminal. The circuit described comprises a current mirror in that current, $I_{REF}$, through a master circuit 44a that includes the line carrying $V_{LED}$, transistor Q2, transistors $Q1^0$–$Q1^N$ (FIG. 5) and ground, is mirrored or proportionally maintained in each of the identical slave circuits 44b, one of which shown comprises the line carrying $V_{LED}$, transistor Q13, an LED 30, and ground.

The operation of this current mirror will now be described. It will be appreciated that each slave circuit forming a part of this driver circuit will behave in the same manner, assuming a same logic signal is provided. With a "high" logic signal provided by the AND gate 43 to the input of inverter 46, the output of the inverter goes to a logic low level and transistor Q12 turns on, due to a negative potential difference between the gate of transistor Q12 and its source terminal and causes current $I_{01}$ to flow through $LED_1$. Current $I_{01}$ is proportional to current $I_{REF}$ flowing through the master circuit due to transistors Q2 and Q13 having approximately the same source potentials and gate potentials. N+1 transistors $Q1^0$–$Q1^N$ (see FIG. 5) control the level of $I_{REF}$ in accordance with a digital control signal at each of their respective gate terminals $D_o$–$D_N$. As noted above, the output of the inverter 4 goes to a "low" logic level due to the concurrence of a logic "high" input signal on the AND gate's 43 data terminal and a logic "high" strobe or trigger pulse signal on its other input terminal. When the strobe pulse drops down to a logic "low" level, the output of AND gate 43 goes "low" and the output of inverter 46 goes to a logic "high" level and turns off transistor Q12 and turns on transistor Q11. This removes the needed bias for transistor Q13 to operate and it, too, turns off or ceases to conduct, thereby preventing any current from flowing to $LED_1$. Thus, the on-time for exposing each pixel on the recording medium is determined by the strobe signal and the amount of current controlling the brightness of this LED is controlled by the level of the current $I_{01}$.

The improved printer apparatus of the invention is characterized by the use of digital control over regulation of the current in the master control circuit. Transistors $Q1^0$–$Q1^N$ are parallel-connected transistors whose respective gate width (W) to gate length (L) ratios are scaled so that in the preferred embodiment their respective currents $I_10$–$I_1N$ are scaled approximately in powers of two as follows:

$$I_1^N : I_1^{N-1} : \ldots I_1^2 : I_1^1 : I_1^0 = 2^N : 2^{N-1} : \ldots 2^2 : 2^1 : 2^0$$

Figure 6:
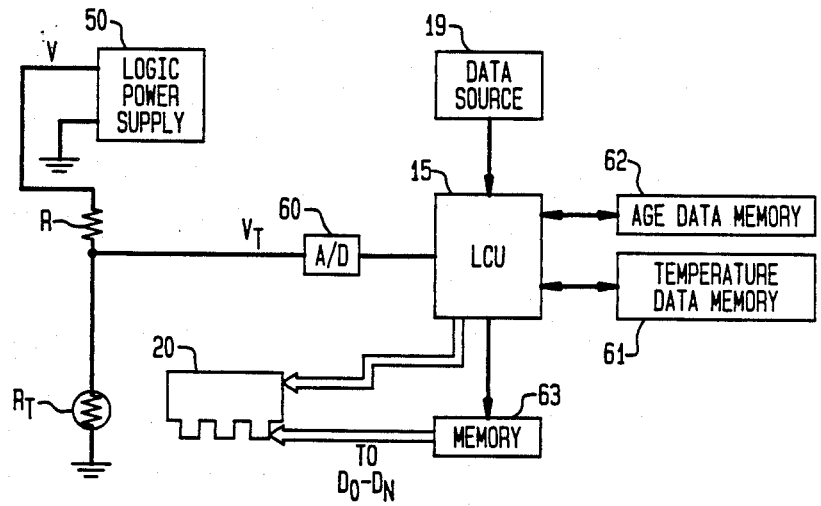
FIG. 6 is a schematic of a circuit for operating the printhead in response to an environmental and aging condition.
Figure 7A:
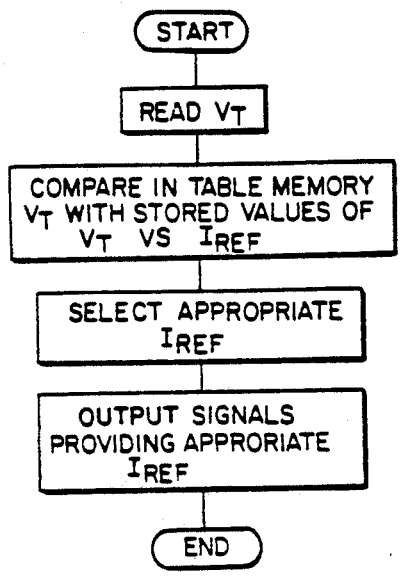
FIGS. 7a and 7b are flowcharts for programs for operating the print apparatus in accordance with certain aspects of the invention.
Figure 7B:
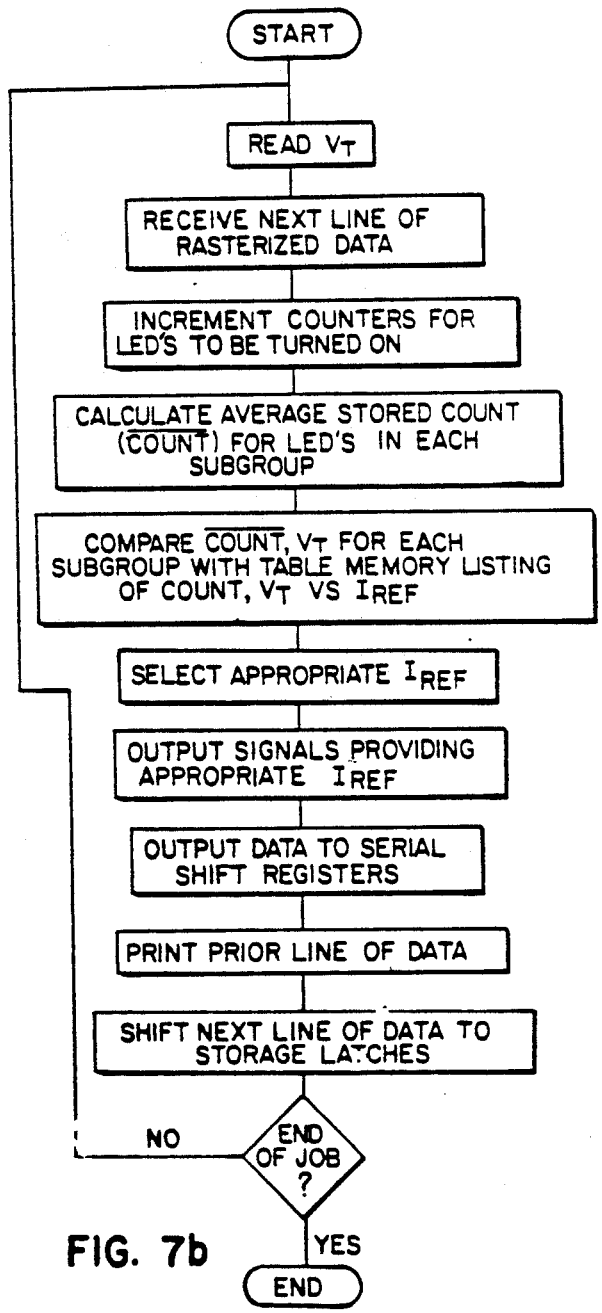

The exact width to length ratio for each of the transistors will need to be empirically determined to achieve the desired current ratios. Thus, a digital signal (either "on" or "off") to the respective gates $D_o$–$D_N$ of transistors $Q1^0$–$Q1^N$ determines the current $I_{REF}$ to be carried through the master control circuit, and the advantage of such will now be described with reference also to FIG. 6 and the flowcharts of FIG. 7. Printhead 20 has associated therewith one or more thermistors, $R_T$. Although only one is shown, preferably more are provided at suitable intervals along the printhead, as it is likely that temperature differences exist along the printhead thereby affecting light emissions from LED's differently. A voltage signal, $V_T$, is generated in response to the respective temperature in the printhead in accordance with known techniques, and this voltage signal is converted into a corresponding digital signal by analog to digital converter 60. The digital signal representing temperature(s) of the printhead (or the different areas of the printhead) are fed to Logic and Control Unit 15 where it is stored in temporary memory device 61. In addition, LCU 15 controls the flow of data from Data Source 19 to the printhead 20 and keeps track of the average number of activations of each subgroup of LED's by storing such data in memory device 62. Recall that each LED chip includes 128 LED's and thus each subgroup of 64 LED's within the chip is driven by a different master driver circuit that is controlled by the LCU 15. In the case where eachg driver circuit is individually controllable by the LCU, the LCU through an appropriate program calculates an appropriate driver current based upon average age of the LED's in that subgroup and/or the current temperature of the printhead as measured as close as possible to the respective subgroup of LED's, i.e. a local temperature reading. A memory 63 (such as a PROM, EPROM, EEPROM or RAM Register or other suitable programmable memory) is provided and may have stored therein as a look-up table device output signals for lines $D_o$–$D_N$ in terms of temperature and age. Regardless of how a correction signal is generated, the signal to gate terminals $D_o$–$D_N$ is a multibit digital signal or digital word representing a control current that is to be generated and delivered to the master control circuit of each driver circuit. This digital control signal merely determines which ones of the transistors $Q1^0$–$Q1^N$ will be "on" for that respective driver circuit. Where driver circuits are separately controllable, a different digital signal can be provided to them such as by separate lines. As the signals are digital, a separate storage register may be associated with each driver circuit so that the digital word can be transferred to same along with an appropriate address signal so that all the driver circuits may be addressed from memory 63 over the same lines with the digital word for each driver stored at an appropriate register on the printhead.

As noted above, the transistors in each driver circuit have different current conducting capabilities depending upon their gate dimensions and not the level of the control signal to them (which is the same for those transistors turned "on"). Thus, an appropriate "on" control signal level delivered to transistor $Q1^2$ at gate terminal $D_2$ causes this transistor to conduct twice as much current as the same level signal delivered to transistor $Q1^1$ at gate terminal $D_1$ and four times the current as the same level signal delivered to transistor $Q1^0$ at gate terminal $D_o$. With all the currents being in parallel, the current $I_{REF}$ is the sum of these individual currents through their respective transistors and $I_{REF}$ is mirrored or is proportional to the currents $I_{01}$, $I_{02}$ ... etc. in the lines carrying current to the respective LED's associated with that driver circuit. As there is a great range of control over the current $I_{REF}$ by determining which of the transistors are to carry current, there is a great range of control over the currents in the respective LED's.

While the preferred embodiment has been described in terms of MOS transistors that have their respective gates controlled, other devices providing an equivalent function such as bi-polar or other gate controlled devices are also contemplated. Where bipolar transistors are used, emitter-collector-geometry or doping levels to respective transistors may be modified to provide the current scaling characteristics described herein. Although the invention has been described in terms of a binary printhead; i.e., either an LED is turned "on" or "off" for recording a dot, the invention is also applicable to grey level printing wherein the logic signal on line 45 may be of a timed duration related to a grey level dot to be recorded. The signal on line 45 thereby determining the "on" time for recording of the dot while the level of current $I_o$, through LED, is controlled by the master control circuit, see aforementioned U.S. Pat. No. 4,750,010 regarding grey level recording. The preferred embodiment has been illustrated with reference to a particular relationship; i.e., 1, 2, 4, 8, etc. in current carrying capabilities of respective transistors forming the control group for the master circuit. Other ratios are, of course, contemplated and indeed transistors $Q1^0$–$Q1^N$ may have the same current carrying capability, the range of possible total currents in such case not being as great as described above.

Figure 5:
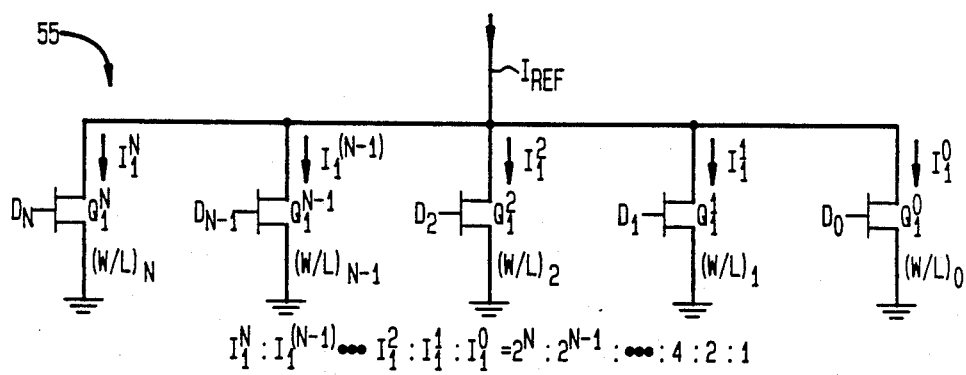
FIG. 5 is a schematic of a circuit for a digital current regulating device for use in the printhead of the invention.
Figure 8:
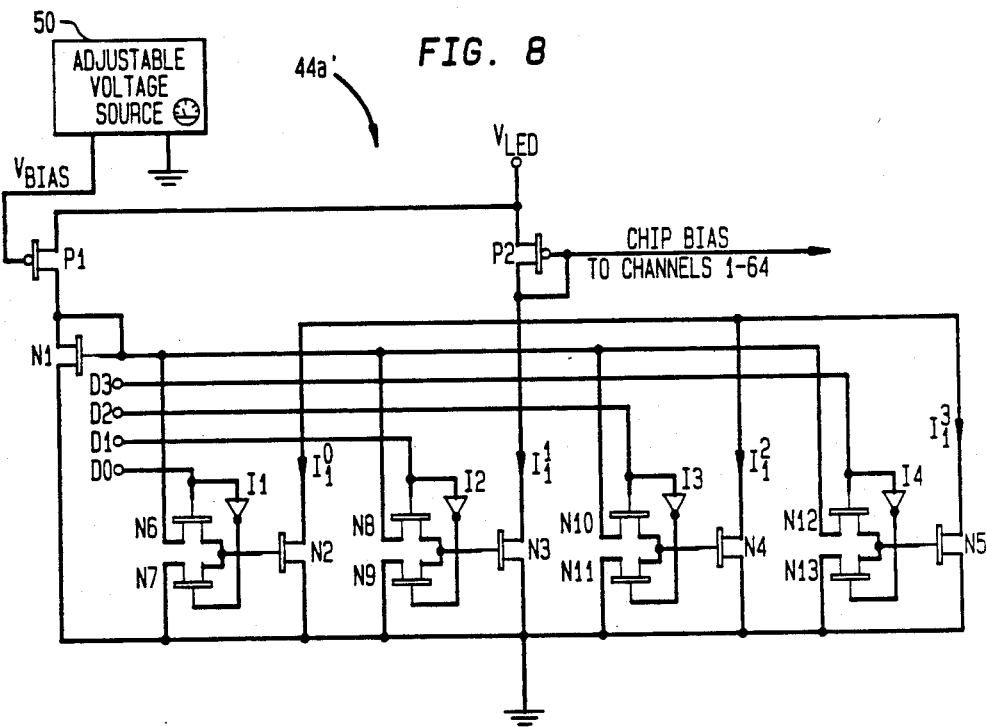
FIG. 8 is a schematic of another embodiment of a circuit for a digital current regulating device for use in the printhead of the invention.

In the embodiment described above, adjustment to current level in the master circuit is limited to adjustment as to which of the transistors $Q1^0$–$Q1^N$ are to be turned "on". For greater adjustability of current control the alternative embodiment of FIG. 8 will now be described. The embodiment of FIG. 8 may be described as providing two-way adjustability as compared to the one-way adjustability described in the embodiment of FIGS. 4 and 5. In the embodiment of FIGS. 4 and 5, the adjustability of the "on" states of the various transistors $Q1^0$–$Q1^N$ controls the voltage level on the line identified as "chip bias." This voltage level is then impressed upon each of the LED's current controlling transistors (such as Q13, etc) thereby controlling the level of current through those LED's selected for energization. FIG. 8 illustrates a master circuit 44'a which provides adjustability using the technique illustrated in FIGS. 4 and 5 as well as the adjustability in the use of an adjustable voltage source 50 (which need not be on the printhead per se) which provides a variable voltage bias $V_{BIAS}$ to the gate terminal of p-channel CMOS transistor P1. Transistor P1 had its source terminal coupled to the line $V_{LED}$ and its drain terminal connected to the drain terminal of an n-channel CMOS transistor N1. The drail terminal of transistor N1 is coupled directly to its gate terminal. The gate terminal of transistor N1 provides a gate bias that, through selected control transistors, biases digitally switchable transistors N2, N3, N4 and N5. It should be noted that while four digitally switchable transistors are shown for this master circuit that this is exemplary and that fewer and greater numbers of transistors may be provided. Description will now be provided with regard to switching of transistor N2, it being understood that operation of transistors N3, N4 and N5 are identical. With a selected voltage $V_{BIAS}$ provided to the gate of transistor P1 and appropriate voltage $V_{LED}$, current flow through transistors P1 and N1 and establishes a voltage level at the gate of N1 that is related to $V_{BIAS}$. Switching transistor N6 receives either a low level or high level logic signal to its gate via line DΦ. DΦ is similar to the digital signals discussed with regard to the transistors of FIG. 5 and is used to control whether or not current flow through transistor N2. With a high level digital signal provided upon line DΦ, transistor N6 becomes conductive and connects the gate of transistor N1 to transistor N2. Transistor N2 thus becomes conductive, too, and conducts current along the path from $V_{LED}$, through transistors P2 and N2 and then ground. The bias at the gate of transistor P2 is thus related to the amount of current carried through transistors N2, N3, N4 and N5. The current through each of these latter four transistors is related to: (1) whether or not the transistor is selected to be "on" or current conducting, (2) if it is "on", what is its current conducting capability as established by its gate width to length ratio and (3) what is the voltage bias provided at its respective gate (a factor directly related to $V_{BIAS}$). As described for the embodiment of FIG. 5, the transistors N2, N3, N4 and N5 preferably have different gate width to length ratios so that the same voltage biases applied to them result in substantially different current conducting capabilities. In this example, the gate width to length ratios of transistors N5, N4, N3, N2 are fabricated so that their respective currents $$I_1^3, I_1^2, I_1^1, I_1^0,$$

are in a ratio of 8:4:2:1. Thus, the gate bias of transistor P2 has been shown to have two-way adjustability. The gate bias of transistor P2 is used as the chip bias for each of the channels shown in FIG. 4 and thus biases the gates of transistors, such as transistor Q13, in the slave circuits to control currents through the respective LED's 30. Switching transistors N6, N8, N10 and N12 are corresponding equivalents for transistors N2, N3, N4 and N5, respectively. Switching transistors N7, N9, N11 and N13 have their gates respectively coupled to the outputs of inverters I1, I2, I3 and I4 and ensure that respective transistors N2, N3, N4 and N5 remain "off" when a digital low level signal is applied to the input of inverters I1, I2, I3 and I4 over control line DΦ, D1, D2 and D3, respectively.

Figure 9:
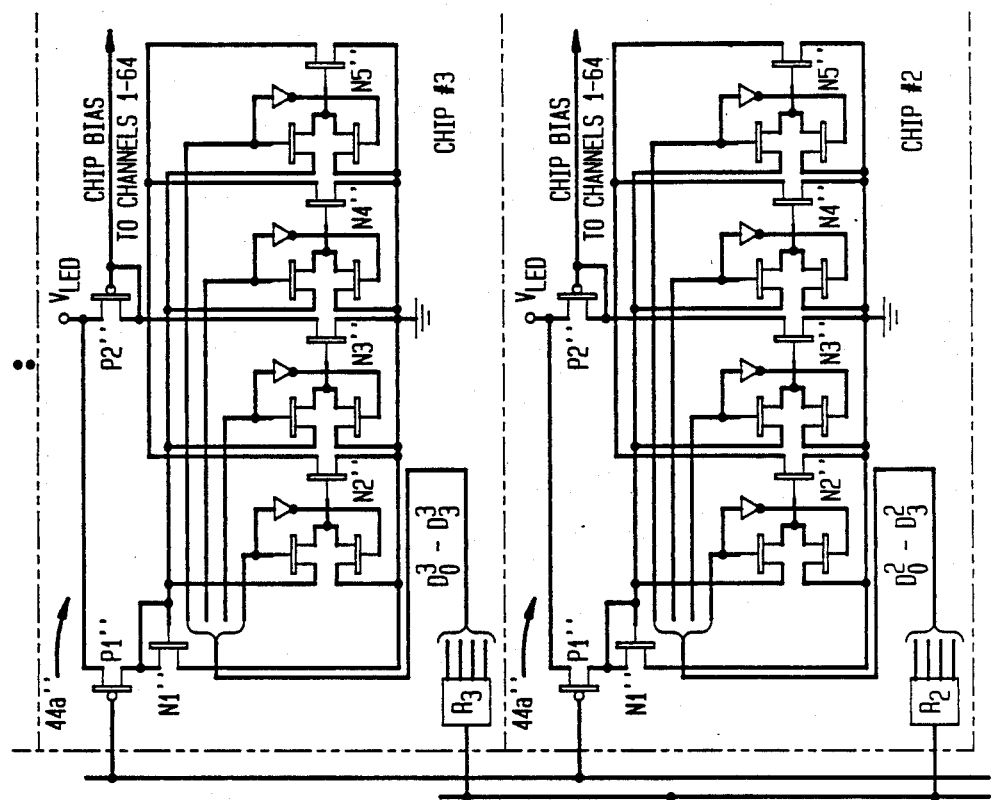
FIGS. 9, 9A and 9B are a schematic of yet another embodiment of a circuit for a digital current regulating device for use in the printhead of the invention.
Figure 9A:
Figure 9B:
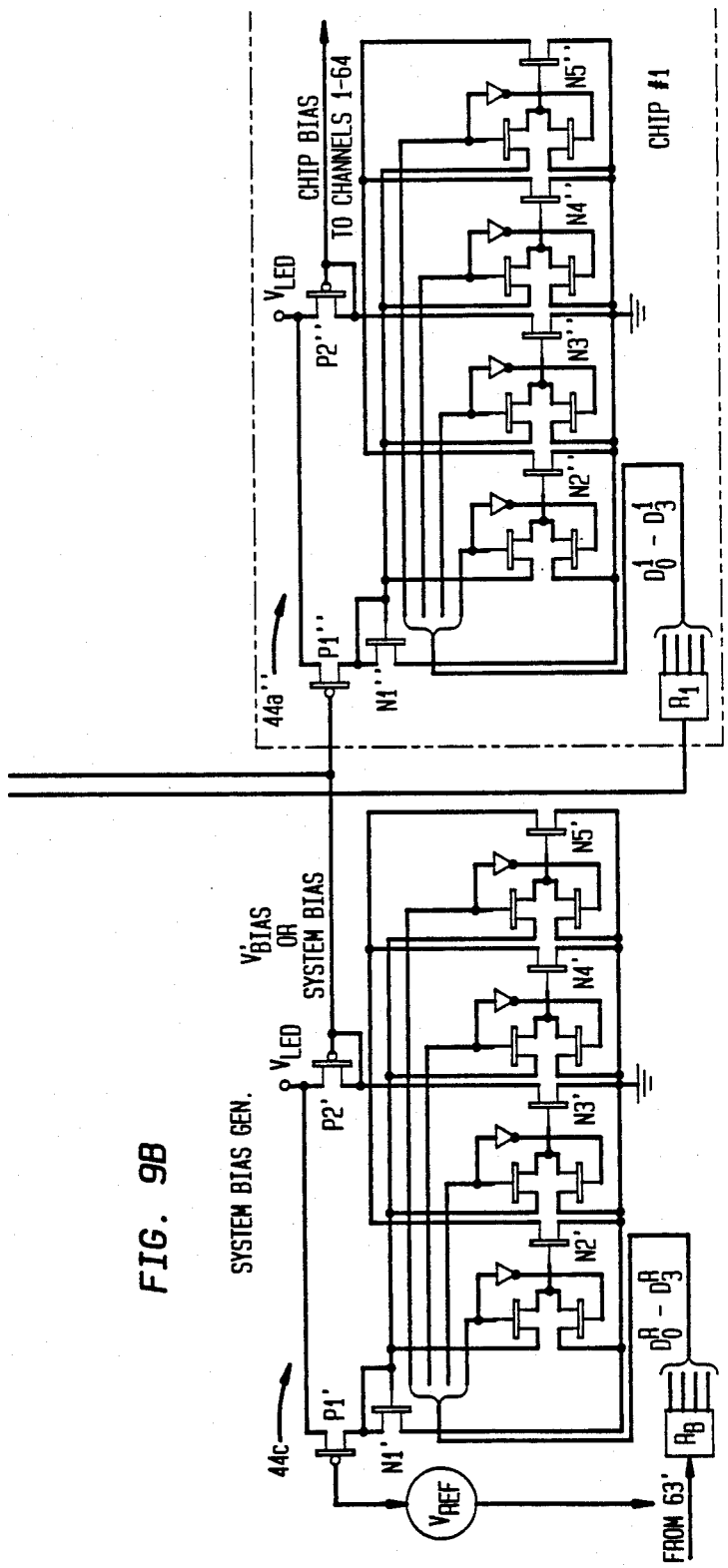

Description will now be provided with reference to FIG. 9 of still another embodiment for providing digital control over the amount of current carried by the current mirrors controlling current through the LED's. In the embodiment of FIG. 9, portions of three identical driver chips are illustrated and identified as chip #1, chip #2, chip #3, etc. As may be noted in the description provided above for FIG. 2, a typical printhead described may have say 56 of these driver chips 40. Associated with each of these chips in the embodiment of FIG. 9 is a master current regulating circuit 44"a as shown in FIG. 8. In the embodiment shown in FIG. 8 each driver chip has a master circuit current controller 44"a integrated therein. However, the adjustable V$_{BIAS}$ signal is provided from a source outside the chip and in the simplest case this adjustable V$_{BIAS}$ is common to all driver chips. In order to change this V$_{BIAS}$ and assuming a printhead where automatic control to change is desired such as made necessary due to LED aging and-/or environmental conditions, it would be desirable to provide digital control over the adjustment of V$_{BIAS}$. To this end, a control circuit 44c identical with that shown in FIG. 8 is provided on the printhead separate from the driver chips. A fixed reference voltage, V$_{REF}$, is provided at the gate input P'1. A memory register, R$_B$, coupled to say memory 63' receives and stores a 4-bit digital signal related to the appropriate V'$_{BIAS}$ or system bias to be provided to each of the master current regulating circuits 44"a in driver chips #1, #2, #3, —— #56, etc. This V'$_{BIAS}$ represents the voltage level at the gate of transistor P2' and is generated by controlling the current through digitally switchable transistors N2', N3', N4' and N5' whose control and relative ratios of currents conducted therethrough may be similar to that described for the master current control regulator 44'a shown and described above for FIG. 8. The digital storage register R$_B$ stores the 4-bit signal from memory 63' that is related to the calculated V'$_{BIAS}$ to be used. This value was calculated by the LCU 15 based on say temperature and/or age data and the memory 63' or a suitable computing device provides a corresponding 4-bit signal to register R$_B$. It should be understood that while one line is indicated for data D0$^R$–D3$^R$ incoming to register R$_B$ that more than one line may be provided.

It will be also noted from FIG. 9 that each chip also includes a similar 4-bit register R1, R2, R3, . . . R56, respectively for storing the respective 4-bit digital signals $$D_0^1 - D_3^1, D_0^2 - D_3^2, D_0^3 - D_3^3 \ldots D_0^{56} - D_3^{56}$$

for regulating the respective 4 digitally switchable transistors in their respective master current regulating circuits 44"a. The result is that the chip bias voltage produced in each circuit 44"a has two-way digital controllability. That is, V'$_{BIAS}$ input into each driver chip is controlled by the circuit 44c labelled "System Bias Gen." and further controlled by regulation within the respective circuits 44"a of which respective transistors N2", N3", N4" and N5" are turned "on". As noted for the embodiment of FIG. 8, all of the groups of the switchable transistors N2', N3', N4', N5', N2", N3", N4" and N5", shown in FIG. 9, have their respective gate width to length ratios appropriately scaled (note example above of 8:4:2:1 ratio of scaling) as discussed above to give great breadth to the extent of the groups adjustability in terms of current flow and thus V$_{BIAS}$ level control and chip bias level control. The respective chip bias potentials at the gates of the transistors P"2 within each driver chip is connected to the chip bias line of each of the 64 channels used for driving the 64 LED's controlled by the channels (see FIG. 4). That is, those LED's to be activated for a single flash exposure for forming a dot-like image on a recording member have their respective currents controlled during such exposure, each by a transistor such as Q13 illustrated for LED 1.

The print apparatus when provided with appropriate sensors can be automatically adjusted for changes in environmental conditions. If desired, the LCU can be programmed to provide for a default condition where say sensors are not operative or in a service mode to provide a digital adjusting signal that defaults to the middle of the operating range. Thus, where 8-bit words are used to control the current mirrors described herein, adjustability is at 255 levels. A default signal of say decimal 128 provides a current level that should be useful in providing reasonable copy quality.

There has been described a new and improved printer apparatus and method for printing that is capable of direct digital control of current in the driver circuit and eliminates the need to "trim" or adjust the multitude of resistors present on printheads described in the prior art. The structure is relatively easily provided for in the manufacturing process in integrated circuit form as part of an integrated circuit chip comprising the driver chip. Reduced manufacturing costs also result because of the elimination of the need to control many levels of analog current.

The invention has been described in detail with particular reference to preferred embodiments thereof, but it will be understood that variations and modifications can be effected within the spirit and scope of the invention.

What is claimed is:

1. In a printing apparatus for exposing a radiation sensitive recording medium; a print head including a series of point-like radiation sources arranged in a row for exposing the medium, means for moving the medium relative to the print head; means providing data signals representing data to be printed; logic means responsive to the data signals for determining which of the point-like radiation sources are to be selected for energization; current driver means responsive to the logic means for providing electrical current to the radiation sources selected for energization; wherein the current driver means includes a current mirror having a master circuit for generating a reference current and a plurality of slave circuits for providing respective driver currents to the radiation sources selected for energization; the master circuit being characterized by a plurality of individually addressable current regulating devices; and digital control means for digitally addressing each such current regulating device to control the level of current in the master circuit.

2. The apparatus of claim 1 and wherein the current regulating devices are arranged in parallel.

3. The apparatus of claim 2 and wherein the current regulating devices are transistors.

4. The apparatus of claims 1, 2 or 3 and wherein the current regulating devices have respective control terminals and different current carrying capabilities when activated by a similar signal at each of their respective control terminals.

5. The apparatus of claim 4 and wherein the control terminals of the current regulating devices have different width to length ratios.

6. The apparatus of claim 5 and wherein there are N+1 current regulating devices in a master circuit, N being an integer greater than or equal to one, and the ratio of the respective currents conducted through the devices are:

$$2^N : 2^{N-1} : \ldots : 2^2 : 2^1 : 2^0.$$

7. The apparatus of claim 6 and wherein the digital addressing means includes means for controlling the current in response to environmental conditions.

8. The apparatus of claim 7 and wherein the printing apparatus includes a plurality of current driver means each for driving respective radiation sources, the digital addressing means controlling current in response to local environmental conditions for the respective radiation sources driven by a driver means so that current to the radiation sources is adjusted in accordance with local environmental conditions.

9. The apparatus of claim 7 and including temperature sensing means for sensing the temperature of the printhead.

10. The apparatus of claim 6 and wherein the digital addressing means includes means for controlling the current in response to aging of the printhead.

11. The apparatus of claims 1, 2 or 3 and wherein the digital addressing means includes means for controlling the current in response to environmental conditions.

12. The apparatus of claim 1 and wherein the slave circuit for each radiation source includes a respective transistor and wherein the master circuit includes means for providing a first voltage bias to the respective transistors to cause same to conduct with controlled levels of current.

13. The apparatus of claim 12 and wherein the master circuit includes a first transistor and a second transistor, the second transistor establishing the said first voltage bias in response to both a voltage bias associated with said transistor and the current passing through the second transistor.

14. The apparatus of claim 13 and wherein the current passing through the second transistor is related to which of the current regulating devices are addressed to cause current to flow therethrough.

15. The apparatus of claim 14 and wherein the current regulating devices are arranged in parallel.

16. The apparatus of claim 15 and wherein the current regulating devices are transistors.

17. The apparatus of claims 12, 13, 14, 15 or 16 and wherein the current regulating devices have different current carrying capabilities when activated by a similar signal at each of their respective control terminals.

18. The apparatus of claim 17 and wherein the current regulating devices have different gate width to length ratios.

19. The apparatus of claim 18 and wherein there are N+1 current regulating devices in a master circuit, N being an integer greater than or equal to one, and the ratio of the respective currents conducted through the devices are:

$$2^N : 2^{N-1} : \ldots : 2^2 : 2^1 : 2^0.$$

20. The apparatus of claim 18 and wherein the digital addressing means includes means for controlling the current in response to temperature of the printhead.

21. The apparatus of claim 18 and wherein the digital addressing means includes means for controlling the current in response to aging of the printhead.

22. The apparatus of claims 13 or 14 and including means for adjusting the voltage bias associated with said first transistor said adjusting means including a plurality of individually addressable current regulating devices and digital control means for digitally addressing each such current regulating device to control the level of current in the master circuit.

23. The apparatus of claim 1 wherein a slave circuit comprises a second current regulating means for controlling current to a radiation source selected for energization and the digitally addressed current regulating devices establish an adjustable voltage bias upon the second current regulating means which determines the level of current provided to a radiation source selected for energization.

24. In a method of printing by exposing a radiation sensitive recording medium to radiation from a series of point-like radiation sources arranged in a row for exposing the medium; the steps of moving the medium relative to the radiation sources; providing data signals representing data to be printed for determining which of the point-like radiation sources are to be selected for energization providing electrical current to the radiation sources selected for energization; generating in a master circuit a reference current and in a plurality of slave circuits providing respective driver currents to the radiation sources selected for energization; the method being characterized by individually addressing current regulating devices in the master circuit; and digitally addressing each such current regulating device to control the level of current in the master circuit.

* * * * *